UNITED STATES PATENT OFFICE 2,308,984

SYNTHETIC ORE

Hobart M. Kraner, Bethlehem, Pa., assignor to Bethlehem Steel Company, a corporation of Pennsylvania No Drawing. Application June 14, 1941, Serial No. 398,063

4 Claims. (Cl. 75—54)

This invention relates to a process and product of manufacture of synthetic iron ores, and more particularly to a process and product of manufacture of synthetic iron ores especially suited for basic open hearth furnace use.

Under ordinary conditions, much of the dense iron ore used in steel plants in this country has been imported from Sweden. While the Kirunavaara magnetites, mostly ferrosoferric oxide ($Fe_3O_4$), are rich ores, assaying up to 72.4 per cent iron, they are not greatly richer than the American hematites, chiefly anhydrous ferric oxide ($Fe_2O_3$), from the Lake Superior region, which may be as high as 70 per cent iron. The great advantage of Swedish ores has been their very desirable physical properties for use. Swedish ores, while not exclusively lump, are very dense, usually mixtures of extremely large lumps with a percentage of fine material, while most of the domestic ores are soft and fine.

In the basic open hearth process of making steel, foamy slags act as insulators and retard heat absorption, hence are the cause of great waste of time and fuel. Foaming is produced by the formation of minute bubbles of carbon-monoxide gas at the slag-metal interface, and is much less prevalent with the coarser Swedish ores than with the powdery ores of domestic production. High transportation charges, however, and all the risks and difficulties of wartime transit by sea, make Swedish ores practically unavailable, now, and render an adequate substitute presently imperative.

As low lime content of the slag is also a contributing factor to the foaming of open hearth slags, it is further desirable to get lime into the slag as early as possible in the melt.

It is therefore an object of my invention to produce a lump iron ore from the fine ores which are plentiful in this country, and which may then be used for every purpose to which Swedish ores are adapted.

Another object of my invention is to produce a synthetic iron ore which will eliminate foaming when used in the basic open hearth furnace.

Another object is an ore with a low fusion temperature, giving thereby a saving in heat time and cost of fuel.

Another object is an ore which will reduce erosion in open-hearth refractories.

Still another object is a reduction in cost of ore charges by allowing the substitution of an inexpensive domestic ore product for expensive imported ores.

A fine ore, such as Mahoning (Hibbing) screenings or the like, either sintered or in its natural state, is mixed intimately with a ground and preferably unburnt limestone, such as Annville Pennsylvania limestone or similar grade containing preferably not over 1 per cent silica, and the mixture is then mixed or ground so that the coarsest particles are approximately 10-mesh in size. I have found that about 75 pounds of ore and 45 pounds of limestone is about the best proportion for making 100 pounds of synthetic ore. Other iron-containing materials such as roll scale, which is principally $Fe_3O_4$, and purified blast furnace flue dust, may be substituted in suitable proportions for all or part of the ore if desired. The excess of silica and carbon in flue dust, in the form of discrete particles of quartz, lime silicates, coke and coke ash, may be removed by magnetic separation and/or tabling or other means, before using.

The mixture is then melted in any suitable furnace. Ordinary open hearth furnaces preferably tilting, like the Wellman, Campbell or Talbot types, reverberatory furnaces of the kind used in smelting copper, continuous tank furnaces as in glass making, or periodic enamel frit melting furnaces, are all adaptable for the purpose. Surplus blast furnace or coke-oven gas, normally bled as of no value, is an economical fuel as the temperature is fairly low. The charge of the batch and the flow of molten material may be continuous and in the case of the reverberatory furnace only the refractories of the roof are exposed to the flame, the bottom and sides being covered by the batch itself except for the tap-hole, so bottom refractories are not strictly necessary. The tap-hole may be water-cooled.

Since the heat required to prepare one pound of the product with unburnt limestone is approximately 968.8 B. t. u., while with burnt lime it is only 544.1 B. t. u., the use of pre-calcined limestone might appear more economical at first glance. But the latter figure is lower only because the heat expended in making the burnt lime is not included in the heat required for the melting process, and as the expenditure of the additional energy in calcination cannot be avoided, it is really heat economy to calcine the limestone during the process of fusing with the ore.

The melting point of the ore is lowered from between 2600° F. and 2700° F. to about 2040° F. by the addition of the limestone, thus accelerating the rate of fusion. The batch remains a powder almost to its melting point, which is very sharp. The sintering and melting points are very close together, hence it does not sinter to any great extent before melting and readily lends itself to underfeeding. When melted it is extremely fluid, flowing like water at 2300° F. At about 2380° F. it may be readily cast in molds into pigs or large lumps, which may be broken if desired into head sized lumps suitable for charging into basic open hearth furnaces or it may be charged in molten condition. The resultant product is practically self-fluxing, requiring the addition of only so much limestone as is necessary to adjust for desired finished slags depending on impurities encountered in raw materials used.

A considerable saving in heat and fuel, beyond that inherent in the lowered fusion point of the composition is effected where convenient by charging the molten mixture directly from ladles into the open hearth furnace, omitting the steps of casting and remelting.

This latter practice also shows an advantage from the standpoint of minimizing damage to the refractory hearth of the furnace. In the usual method, limestone is charged on a basic bottom, ore is charged on top of the stone, and scrap on top of this. The entire mass is heated in the furnace until the scrap is white hot and slightly fused, whereupon a charge of molten pig iron is added. Generally there elapses a considerable period of time after the hot metal is charged until the lime and silica are combined. The slag during this period is highly siliceous, largely an iron-manganese silicate which is erosive on furnace bottoms and banks. By charging my liquid material to the furnace just before the hot metal is charged, the silicon which comes to the furnace in the hot metal is immediately oxidized and the silica is precipitated as widely distributed and finely-divided dicalcium silicate. There results a saving of time and refractory costs for fettling furnace bottoms between heats with clinkered and raw dolomites. A saving of fluxing time is also effected by the mode of distribution of the dicalcium silicate.

Using Mahoning hematite ore, with values of 63.5 per cent for iron and 3 per cent for silica, mixed with Annville Pennsylvania limestone about 99 per cent pure about in the proportions stated, the molecular composition of the resultant product is calculated to be as follows:

| | Per cent |
|---|---|
| Calcium ferrite ($CaO.Fe_2O_3$) | 78.95 |
| Free iron oxides | 14.24 |
| Dicalcium silicate ($2CaO.SiO_2$) | 6.89 |

The presence of calcium ferrite and dicalcium silicate is confirmed by microscopic examination of the product, although the proportions will vary somewhat with different iron containing materials and other grades of limestone. The CaO/Fe relation in the product above, for instance, is in the ratio of 25/48 by weight, but there is no objection to increasing the ratio to 1/1 if desired. The less silica, however, as an impurity in the ore and limestone the better, as it is fairly refractory and ties up part of the lime in such a way that it is of little value to the open hearth operation. If there is not sufficient limestone present, in proportion to the silica, some of the silica may combine with part of the iron oxide as well. A total of approximately 5 per cent by weight of silica is therefore acceptable, but less is highly preferable, and in low-silica ores the desired calcium ferrite may approach 85 per cent with little or no gangue of dicalcium silicate or other silicates. As little as 10 per cent of limestone may be used to advantage with low-silica ores, or even the pure iron ore alone when so treated if the higher melting point is not considered objectionable.

In my co-pending divisional application, Serial No. 436,023, filed March 24, 1942, I have described a process and product of manufacture of an open hearth charging ore brick or block with substantially similar objects, advantages and purposes as in my herein-described invention. No claim is made in this application to charging bricks or blocks of iron containing material pressed to shape and fired, as bricks or blocks of such description are claimed in my said co-pending application.

Although I have thus described my invention in considerable detail, I desire it to be clearly understood that I reserve the right to use such substitutions, modifications or equivalents thereof as are embraced within the scope and spirit of my invention, or as are pointed out in the appended claims. The term "iron oxide containing material," for instance, as used in the appended claims, shall be construed to include any suitable iron ore, mill scale, purified flue dust, or other substance of high iron-oxide content.

Having thus described my invention what I claim as new and useful and desire to secure by Letters Patent is:

1. A synthetic ore comprising fine iron-oxide containing material substantially free of silica and carbon, intimately mixed with limestone to aid in fusion, and fused and cast in molds as desired.

2. A fused product comprising a finely divided hematite ore mixed intimately with crushed or ground limestone in approximate porportions of 45 parts of limestone to 75 parts of ore melted and poured into molds and permitted to solidify to form a block for charging into an open hearth furnace or the like.

3. A fused product comprising about 79 per cent calcium ferrite, 15 per cent free iron oxide, and 6 per cent dicalcium silicate, for charging in the cold state as a synthetic basic open hearth ore.

4. A method of saving heat and fuel in steelmaking comprising mixing and melting together iron ore and limestone, permitting same to cool and solidify, and charging the cooled and solid mixture into a basic open-hearth furnace.

HOBART M. KRANER.